Feb. 26, 1924.  
G. FRERICHS  
1,484,704  
APPARATUS FOR THE PRESERVATION OF FOOD AND THE LIKE  
Filed Aug. 1, 1921
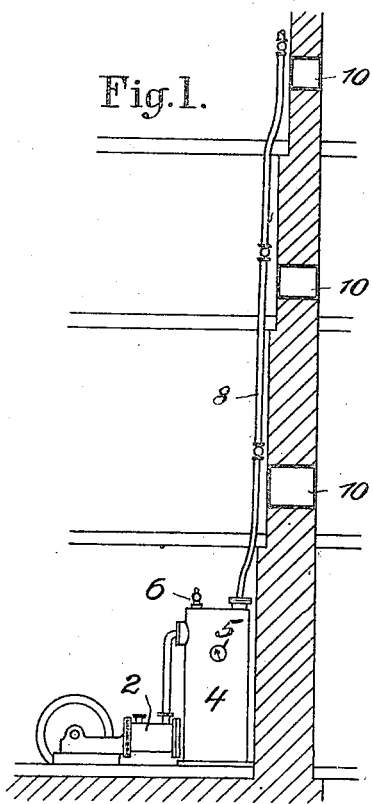
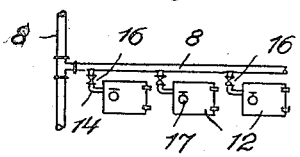
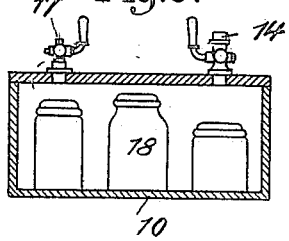
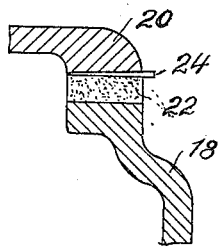
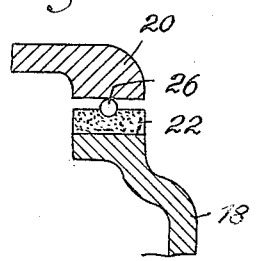
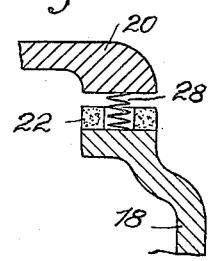

Patented Feb. 26, 1924.

1,484,704

UNITED STATES PATENT OFFICE.

GUSTAV FRERICHS, OF DUISBURG, GERMANY, ASSIGNOR TO WILBUR E. FRERICHS, OF BROOKLYN, NEW YORK.

APPARATUS FOR THE PRESERVATION OF FOOD AND THE LIKE.

Application filed August 1, 1921. Serial No. 489,074.

*To all whom it may concern:*

Be it known that I, GUSTAV FRERICHS, a citizen of the German Republic, residing at Duisburg, in the German Republic, have invented certain new and useful Improvements in Apparatus for the Preservation of Food and the like, for which I have filed applications in Germany, May 21, 1920; England, May 28, 1921; and France, May 21, 1921, and of which the following is a specification.

This invention relates to apparatus for the preservation of food and the like and more particularly to food containing vessels in which a partial vacuum is set up. In preserving food and the like it is customary to employ an apparatus in which the vessels containing the food and with the cover in place are boiled and then allowed to cool down, whereby the air escapes, a partial vacuum is set up in the vessel on cooling and the cover is firmly pressed down upon the vessel by the atmospheric pressure. The hereby required long boiling destroys in many kinds of food the natural flavour, spoils the nutritious and easily digestible proteids and the like and necessitates a considerable expenditure of fuel. It has therefore been suggested to produce the required vacuum by withdrawing the air from the vessel by putting the vessel charged with the food in a hot state in communication with an air pump which causes a rarefaction in the vessel and causes the contents to boil at low temperatures so that the germ containing air is removed from the vessel. Furthermore, if the substances to be treated are put into the previously heated vessels at a temperature of about 95° C. the sterilization process sets in, as the contents continue to boil in the closed vessels for much longer than an hour. In such an apparatus it is difficult and in a household almost impossible to find out whether a sufficient vacuum really exists in the interior of the preserving vessel. Even when only a light vacuum has been created in the vessel the cover is firmly held down by the outer atmosphere for a time, but sooner or later becomes loose and the contents of the vessel then perish.

According to this invention a certain indication that the complete evacuation has taken place is ensured in the following manner. Means are provided below the cover by which the cover is kept raised during the evacuation, but which become embedded in a soft substance of a packing ring when the atmospheric pressure is re-established. These means thus offer a certain resistance to the closing of the lid which is only overcome by the atmospheric pressure if a comparatively high vacuum has been set up within the vessel. If only a small difference exists between the outside and the inside of the vessel, the cover or lid is not held down at all, so that the insufficient evacuation is at once noticed. These means may consist of springs inserted into the india-rubber packing ring or of small balls or raised portions or the like bearing on the ring and which are adapted to be forced into the substance of the ring. I am aware that it is already known to keep the lid of vacuum preserving vessels raised during the evacuation by means of a holding device operated from the outside and to put it in position after the evacuation is finished. This requires, however, the application of special stuffing boxes and gives no guarantee for a correct placing of the lid.

The preserving vessels according to this invention may also be used for sterilizing surgical instruments and the like. If preferred, the evacuation of the vessels may be effected from a central air-pumping plant, which enables receptacles to be evacuated that are situated at separate places and into which the preserving vessels can be inserted.

In the accompanying drawings several embodiments of the invention are illustrated by way of example.

Fig. 1 shows diagrammatically a central installation for a building of several floors, Fig. 2 a preserving plant on one floor.

Fig. 3 a vacuum receptacle in cross-section and

Figs. 4, 5 and 6 various constructions of preserving vessels.

Referring to Fig. 1, which illustrates a plant for a high building, it will be seen that an air-pump 2 withdraws the air from a tank 4 furnished with a vacuum gauge 5. This tank is provided with an air-cock 6 and is connected with a system of pipes ascending the whole height of the house. In the various floors of the house vacuum boxes 10 are provided in the walls, which can be closed by covers and which communicate by branch pipes 14 provided with cocks or valves 16 (Fig. 2) with the suitable distribution suction pipes 8. The covers of the boxes 10 are furnished with air-cocks 17 and are hinged to the vacuum boxes, a suitable packing being provided between the cover and the box to ensure an air-tight seal.

The vessels 18 to be evacuated for the preservation of the contents are inserted into these boxes. The vessels 18 are fitted with a cover or lid 20 which is placed upon their upper flange, a suitable packing 22 being provided between it and the vessel.

According to Fig. 4 a wedge-shaped member 24 and according to Fig. 5 a small ball 26 is inserted between the cover and the resilient packing ring 22. In the modification according to Fig. 6, springs 28 are inserted into the packing ring 22. These means such as wedge, ball or springs tend to hold the cover off the packing.

The mode of operation is as follows:—

The food to be preserved in as hot a condition as possible is put into the vessels 18. The vessels are then inserted into the vacuum chests 10 of which preferably a number of various sizes are provided on each floor. The lids of the chests are then closed and also the air-cock in each lid. Now the valve 16 is opened and the vacuum chests hereby put into communication with the suction pipe 8. By the air pump a high vacuum has been produced in this suction pipe 8 so that the air is quickly sucked out of the vacuum chest. The air will hereby be entirely removed from the preserving vessels and be replaced by the steam liberated from the food. The lids of the preserving vessels are so wide open, that the air can escape completely from the vessels without material resistance.

After this has been accomplished, the valve 16 is closed and the air-cock 17 opened. The air quickly entering the vacuum chest at once closes the lids of the preserving vessels so that they may now after opening the cover be removed from the chest. The opening of the vessels may, with the construction of vessels according to Fig. 4, be easily effected by pushing the wedge-shaped pin 24 inwardly.

If desired other lines of piping may be connected with the air-tank 4 which lead to vacuum cleaners. In a similar manner the evacuation with preserve-factories, fish-steamers, provision-steamers, large passenger steamers and the like may be effected by the condensation plant. In hospitals and kitchens the evacuation may be effected either by a hand-pump or by a small electrically driven piston or other pump.

This preservation method is of special importance for preserve factories which use tins. The tins are provided with a rim and the lid is corrugated and furnished with a special projection. A packing is inserted between lid and tin and the tin is then evacuated, in the aforedescribed manner. When atmospheric air is readmitted into the vacuum chest, the lid is closed and the tin sealed by the external pressure and thus the soldering, testing and so on of the vessels are obviated. As in order to open the tin it is sufficient to prick a small hole into the lid, the vessels and lids may be used repeatedly as it is easy to safely close the small hole. With small installations it suffices to produce a partial vacuum in the chests or boxes for the reception of the preserving vessels by means of a hand-pump.

I claim:—

1. The combination with a vessel for preserving or storing food or other articles under a vacuum, of a receptacle, a cover for said receptacle, a resilient packing ring between said receptacle and said cover, and means disposed upon said packing ring and adapted to hold said cover raised above said ring until a sufficiently high vacuum has been set up within said receptacle, and, on the admission of atmospheric pressure, to be depressed into the ring and thereby allow the cover to bear upon the packing ring and to form a permanent air-tight seal, substantially as described.

2. A packing for insertion between an evacuated receptacle and its cover, consisting of a member of resilient material, and means disposed on said member and capable of holding said cover open and adapted to be depressed into said member by atmospheric pressure.

In testimony whereof I have affixed my signature in presence of two witnesses.

GUSTAV FRERICHS.

Witnesses:
 KARL HALLBAUER.
 MAX KENSBY.